US009076341B2

(12) United States Patent
Funabashi

(10) Patent No.: US 9,076,341 B2
(45) Date of Patent: Jul. 7, 2015

(54) VEHICLE TO VEHICLE COMMUNICATION DEVICE AND CONVOY TRAVEL CONTROL DEVICE

(71) Applicant: DENSO CORPORATION, Kariya, Aichi-pref. (JP)

(72) Inventor: Junichiro Funabashi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 69 days.

(21) Appl. No.: 14/101,731

(22) Filed: Dec. 10, 2013

(65) Prior Publication Data

US 2014/0172265 A1 Jun. 19, 2014

(30) Foreign Application Priority Data

Dec. 19, 2012 (JP) ................................ 2012-277332

(51) Int. Cl.
*G06F 19/00* (2011.01)
*G08G 1/00* (2006.01)
*G08G 1/16* (2006.01)

(52) U.S. Cl.
CPC . *G08G 1/22* (2013.01); *G08G 1/163* (2013.01)

(58) Field of Classification Search
None
See application file for complete search history.

(56) References Cited

U.S. PATENT DOCUMENTS 5,680,122 A * 10/1997 Mio .............................. 340/932
6,313,758 B1 * 11/2001 Kobayashi .................... 340/932
7,515,997 B2 * 4/2009 Imai .................................. 701/1
8,676,466 B2 * 3/2014 Mudalige ........................ 701/93
2013/0261948 A1 * 10/2013 Funabashi ..................... 701/300

FOREIGN PATENT DOCUMENTS

JP 7-200991 8/1995
JP 09-081899 3/1997
JP 2000-339599 12/2000

OTHER PUBLICATIONS

Office Action dated Nov. 4, 2014 in corresponding Japanese Application No. 2012-277332.

* cited by examiner

*Primary Examiner* — Redhwan K Mawari
*Assistant Examiner* — Edward Torchinsky
(74) *Attorney, Agent, or Firm* — Harness, Dickey & Pierce, PLC

(57) ABSTRACT

A vehicle-to-vehicle communication device mounted to a subject vehicle with a traveling control device is provided. The vehicle-to-vehicle communication device includes a communication portion, a connection transmission process portion, a connection control signal obtain portion, a connection signal obtain portion, and a connection control signal transmission process portion. The communication portion receives and transmits a signal between the subject vehicle and a preceding vehicle, and between the subject vehicle and a follower vehicle. The connection transmission process portion transmits a connection request signal. The connection control signal obtain portion obtains a connection control signal. A convoy travel control device includes the vehicle-to-vehicle communication device and the traveling control device. The traveling control device periodically outputs a first instruction and a second instruction to the vehicle-to-vehicle communication device.

4 Claims, 9 Drawing Sheets

FIG. 11

(EXPRESSION 1)

$$d^2=(y-x)^T \Sigma^{-1} (y-x)$$

$$\Sigma^{-1} = \begin{pmatrix} s_{11} & s_{12} & s_{13} \\ s_{21} & s_{22} & s_{23} \\ s_{31} & s_{32} & s_{33} \end{pmatrix} \quad x = \begin{pmatrix} r_{RADAR} \\ dr_{RADAR} \\ 0 \end{pmatrix} \quad y = \begin{pmatrix} r_{GPS} \\ dr_{GPS} \\ LatOffset \end{pmatrix}$$

VEHICLE TO VEHICLE COMMUNICATION DEVICE AND CONVOY TRAVEL CONTROL DEVICE

CROSS REFERENCE TO RELATED APPLICATION

This application is based on Japanese Patent Application No. 2012-277332 filed on Dec. 19, 2012, the disclosure of which is incorporated herein by reference.

TECHNICAL FIELD

The present disclosure relates to a vehicle-to-vehicle communication device and a convoy travel control device. The vehicle-to-vehicle communication device transmits and receives information used for a convoy travel control. The convoy travel control device includes the vehicle-to-vehicle communication device.

BACKGROUND

In order to provide a convoy configured from multiple vehicles to travel, various kinds of convoy travel control devices are known (e.g., Japanese Patent. No. 3358403 corresponding to U.S. Pat. No. 5,680,122A). A convoy travel control device is mounted on each vehicle of the convoy, and performs a travel control of each vehicle. Behavior of each vehicle configuring the convoy travel during the convoy travel may be described as if one vehicle was connected to another vehicle in front of the one vehicle or behind the one vehicle. Thus, the convoy travel is referred to as a connected travel.

In the convoy travel control device disclosed in Japanese Patent No. 3358403, when a subject vehicle is in an automatic travel mode, the subject vehicle performs the convoy travel with a preceding vehicle if possible. Only when a driver performs a separation instruction about the convoy travel, the subject vehicle separates from the convoy.

SUMMARY

It is an object of the present disclosure to provide a vehicle-to-vehicle communication device and a convoy travel control device.

According to a first aspect of the present disclosure, the vehicle-to-vehicle communication device that is mounted to a subject vehicle with a traveling control device for controlling speed of the subject vehicle is provided. The vehicle-to-vehicle communication device includes a communication portion, a connection transmission process portion, a connection control signal obtain portion, a connection signal obtain portion, and a connection control signal transmission process portion. The communication portion receives and transmits a signal between the subject vehicle and a preceding vehicle, and between the subject vehicle and a follower vehicle. The preceding vehicle travels immediately in front of the subject vehicle. The follower vehicle travels immediately behind the subject vehicle. The signal includes a connection request signal and a connection control signal. The connection transmission process portion transmits the connection request signal from the communication portion to the preceding vehicle. The connection request signal requests to perform a connected travel. The connection control signal obtain portion obtains the connection control signal from the communication portion, and notifies the traveling control device of the connection control signal. The connection control signal is transmitted from the preceding vehicle, received by the communication portion, and indicates whether the preceding vehicle permits or not a vehicle immediately behind the preceding vehicle to perform the connected travel. The connection signal obtain portion obtains the connection request signal and notifies the traveling control device of the connection request signal. The connection request signal is transmitted from the follower vehicle and received by the communication portion. The connection control signal transmission process portion transmits the connection control signal from the communication portion to the follower vehicle.

According to a second aspect of the present disclosure, the convoy travel control device includes the vehicle-to-vehicle communication device and the traveling control device. The traveling control device periodically outputs a first instruction and a second instruction to the vehicle-to-vehicle communication device. The first instruction indicates whether the subject vehicle should connect to or separate from the preceding vehicle, and the second instruction indicates whether the subject vehicle should connect to or separate from the follower vehicle. The connection transmission process portion, based, on the first instruction outputted from the traveling control device to connect with the preceding vehicle, transmits the connection request signal from the communication portion. The connection control signal transmission process portion, based on the second instruction which is outputted from the traveling control device, determines whether the connection control signal should indicate a permission of the connected travel or a prohibition of the connected travel.

According to the above vehicle-to-vehicle communication device and the convoy travel control device, it is possible that the follower vehicle is caused not to perform the connected travel, according to a condition where the follower vehicle should not perform the connected travel.

BRIEF DESCRIPTION OF THE DRAWINGS

The above and other objects, features and advantages of the present disclosure will become more apparent from the following detailed description made with reference to the accompanying drawings. In the drawings:

FIG. 11 is a drawing illustrating an expression 1.

DETAILED DESCRIPTION

When the subject vehicle is in the automatic driving mode, a convoy travel control device disclosed in Japanese Patent No. 3358403 performs the convoy travel with the preceding vehicle if possible. Therefore, even in a situation where a follower vehicle (corresponding to the subject vehicle in this case) should not be connected for the preceding vehicle, the follower vehicle performs the convoy travel with the preceding vehicle.

The situation where the follower vehicle should not be connected to the preceding vehicle is exemplified below. For example, the situation includes a situation where the convoy travel control device of the preceding vehicle can not receive a signal from a global positioning system (GPS) satellite and can not measure a present position, a situation where the convoy travel control device of the preceding vehicle has difficulty, or a situation where a behavior of the preceding vehicle becomes unstable due to a skid, a spin, or the like. In this situation, it is inappropriate that the follower vehicle is connected to the preceding vehicle, and it is appropriate that an inter-vehicle distance to the preceding vehicle make longer than when the connected travel (corresponding to the convoy travel) is performed. According to a technology described in Japanese Patent No. 3358403, even in the situation where the convoy travel is inappropriate, when a condition is satisfied to perform the convoy travel, the follower vehicle performs the convoy travel. As a result, although it is appropriate that the inter-vehicle distance to the preceding vehicle, should be swiftly adjusted from a short inter-vehicle distance in the convoy travel mode to a longer inter-vehicle distance in a normal travel mode, a timing for adjusting the inter-vehicle distance may be late.

When the convoy travel is performed, a follower vehicle follows a preceding vehicle with keeping the inter-vehicle distance short. Since the inter-vehicle distance to the follower vehicle is short, an occupant in the preceding vehicle may have a psychological oppressive feeling. However, according to a conventional technology, even in cases where the occupant in the preceding vehicle has the oppressive feeling, it is not possible to ease the oppressive feeling.

Figure 1:
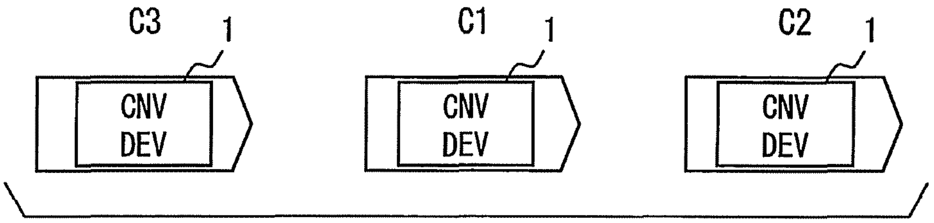
FIG. 1 is a drawing illustrating a usage configuration of a convoy travel control device in the present disclosure.

An embodiment of a present disclosure will be explained with referring to drawings. Three vehicles C1 to C3 are described in FIG. 1. As described in FIG. 1, a convoy travel control device 1 is mounted on each vehicle.

Figure 2:
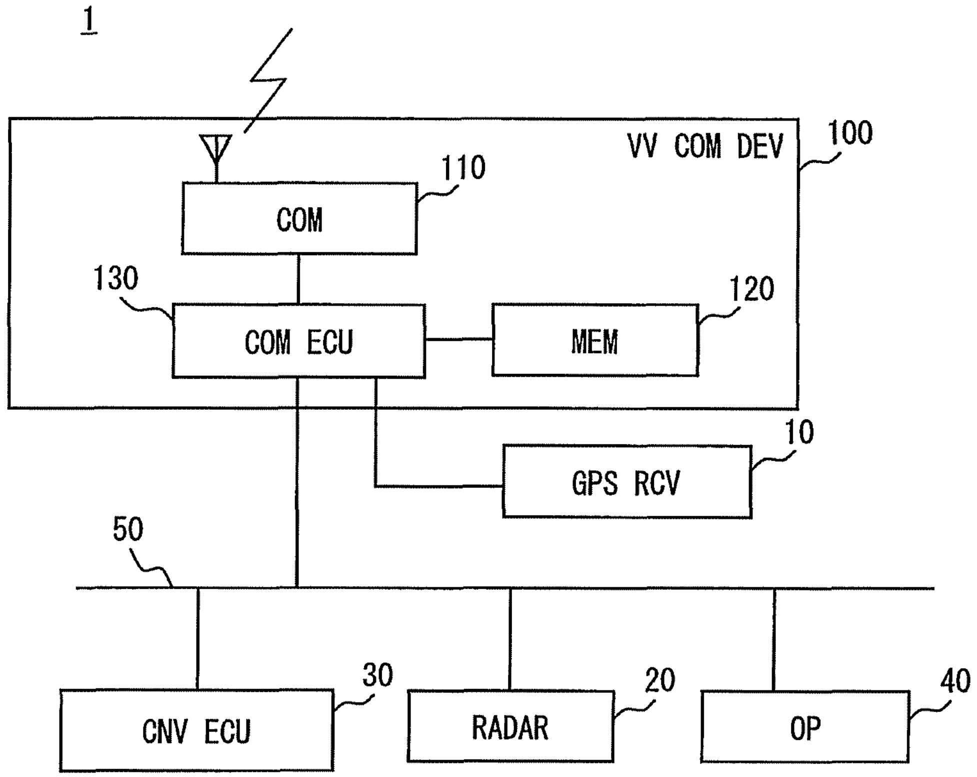
FIG. 2 is a drawing illustrating a configuration of the convoy travel control device.

The convoy travel control device 1, as described in FIG. 2, includes a vehicle-to-vehicle communication device 100, a GPS receiver 10, a radar 20, a convoy travel ECU 30, and an operating device 40.

The GPS receiver 10 receives a signal from a GPS satellite, and successively determines a coordinate of a present position based on the received signal.

The radar 20 radiates an electromagnetic wave at a predetermined direction angle ahead of a subject vehicle, and detects a reflected wave. Based on a time lag from a radiation of the electromagnetic wave to a receiving of the reflected wave, a distance to the closest object, existing in front of the vehicle, is calculated. The electromagnetic wave corresponds to a millimeter-wave radar, a laser radar, or the like. During a vehicle traveling, it may be supposed that the closest object in front of the subject vehicle is another vehicle, i.e., the preceding vehicle. Thus, it is supposed that the distance calculated by the radar 20 corresponds to an inter-vehicle, distance between the subject vehicle and the preceding vehicle.

The convoy travel ECU 30 corresponds to the traveling control device. The convoy travel ECU 30 performs a speed control of a vehicle on which the convoy travel ECU 30 is mounted. The convoy travel ECU 30 determines whether the subject vehicle performs the convoy travel with the preceding vehicle or the follower vehicle, based on vehicle mode notification information that is periodically transmitted from the preceding vehicle or the follower vehicle. Incidentally, the vehicle mode notification information that is transmitted from other peripheral vehicles is not referred in the speed control of the subject vehicle during the convoy travel.

The convoy travel ECU 30 determines that the convoy travel is performed when a convoy mode setting is set into a convoy travel mode, and in addition, when a permission (corresponding to a connection permitting signal) of the convoy travel is received from the preceding vehicle, or when a request (corresponding to a connection request signal) of the convoy travel is received from the follower vehicle. The convoy mode setting is set based on a setting operation by a driver. Incidentally, the convoy travel mode indicates a setting in which the subject vehicle can perform the convoy travel with the preceding vehicle and/or the follower vehicle.

When the subject vehicle performs the convoy travel with the preceding vehicle, the inter-vehicle distance to the preceding vehicle becomes shorter than a normal traveling in which the driver adjusts the inter-vehicle distance to the preceding vehicle, and the subject vehicle forms a convoy with the preceding vehicle. In the convoy travel with the preceding vehicle, vehicle speed or the like of the preceding vehicle is obtained by a vehicle-to-vehicle communication, and a vehicle speed of the subject vehicle is controlled. The inter-vehicle distance during the convoy travel changes according to vehicle speed, and for example, the inter-vehicle distance may correspond to a distance which a vehicle proceeds in 0.5 second at a present vehicle speed. In addition, a determination result which indicates whether a convoy travel is performed with the preceding vehicle or not may be represented by a connection instruction or a separation instruction, respectively. Similarly, the determination result which indicates whether a convoy travel is performed with the follower vehicle may be represented by the connection instruction or the separation instruction. The connection instruction or the separation instruction is transmitted to the communication ECU 130 of the vehicle-to-vehicle communication device 100.

The operating device 40 corresponds to a connection rejection operating device. The driver instructs a setting of the convoy travel mode or a connection rejection through the operating device 40. The operating device 40 generates a signal for instructing a setting of the convoy travel mode, or the connection rejection. The communication ECU 130 of the vehicle-to-vehicle communication device 100 obtains the signal.

The vehicle-to-vehicle communication device 100 includes a communication portion 110, a memory portion 120, and the communication ECU 130. The communication ECU 130 connects to the GPS receiver 10. Incidentally, the GPS receiver 10 may be included in the vehicle-to-vehicle communication device 100. The communication ECU 130, further through a controller area network (CAN) 50, is communicable to other vehicle devices such as the radar 20, the convoy travel ECU 30, the operating device 40, or the like.

The communication portion 110 is a well-known configuration for performing a short range radio communication with a frequency band such as 700 MHz band, 5.8 GHz band, or the like. In the present embodiment, the vehicle-to-vehicle communication is performed in a broadcast method, in which an object vehicle is not specified. A communication range of the vehicle-to-vehicle communication is, for example, in a radius of several hundred meters. Directivity in a horizontal plane is substantially non-directional. The communication portion 110 transmits the vehicle mode notification information of the subject vehicle to surroundings. The communication portion 110 receives the vehicle mode notification information that the vehicle-to-vehicle communication device 100 of a vehicle existing around the subject vehicle transmits. The vehicle mode notification information includes (i) a device ID of the vehicle-to-vehicle communication device 100 which has transmitted the vehicle mode notification information, (ii) a present position (hereinafter, referred to as GPS information), (iii) vehicle speed of the vehicle, on which the vehicle-to-vehicle communication device 100 is mounted, (iv) a direction angle of the vehicle on which the vehicle-to-vehicle communication device 100 is mounted, (v) a width of the vehicle, (vi) a length of the vehicle. The vehicle-to-vehicle communication device 100 measures the present location (i.e., the GPS information) with the GPS receiver 10. Furthermore, the vehicle mode notification information includes a forward vehicle detection mode and a follower vehicle detection mode of the subject vehicle. In addition, when the subject vehicle identifies the preceding vehicle, the vehicle mode notification information includes the device ID of the vehicle-to-vehicle communication device 100 that is mounted on the preceding vehicle. When the subject vehicle identifies the follower vehicle, the vehicle mode notification information includes the device ID of the vehicle-to-vehicle communication device 100 that is mounted on the follower vehicle. Furthermore, the vehicle mode notification information includes a connection signal to the preceding vehicle, and a connection control signal to the follower vehicle.

The memory portion 120 stores (i) the vehicle mode notification information that the communication portion 110 receives from a surrounding vehicle, (ii) an inter-vehicle distance r (radar) to the preceding vehicle, and (iii) a coordinate which is determined by the GPS receiver 10, or the like. The inter-vehicle distance r (radar) is measured by the radar 20.

Figure 3:
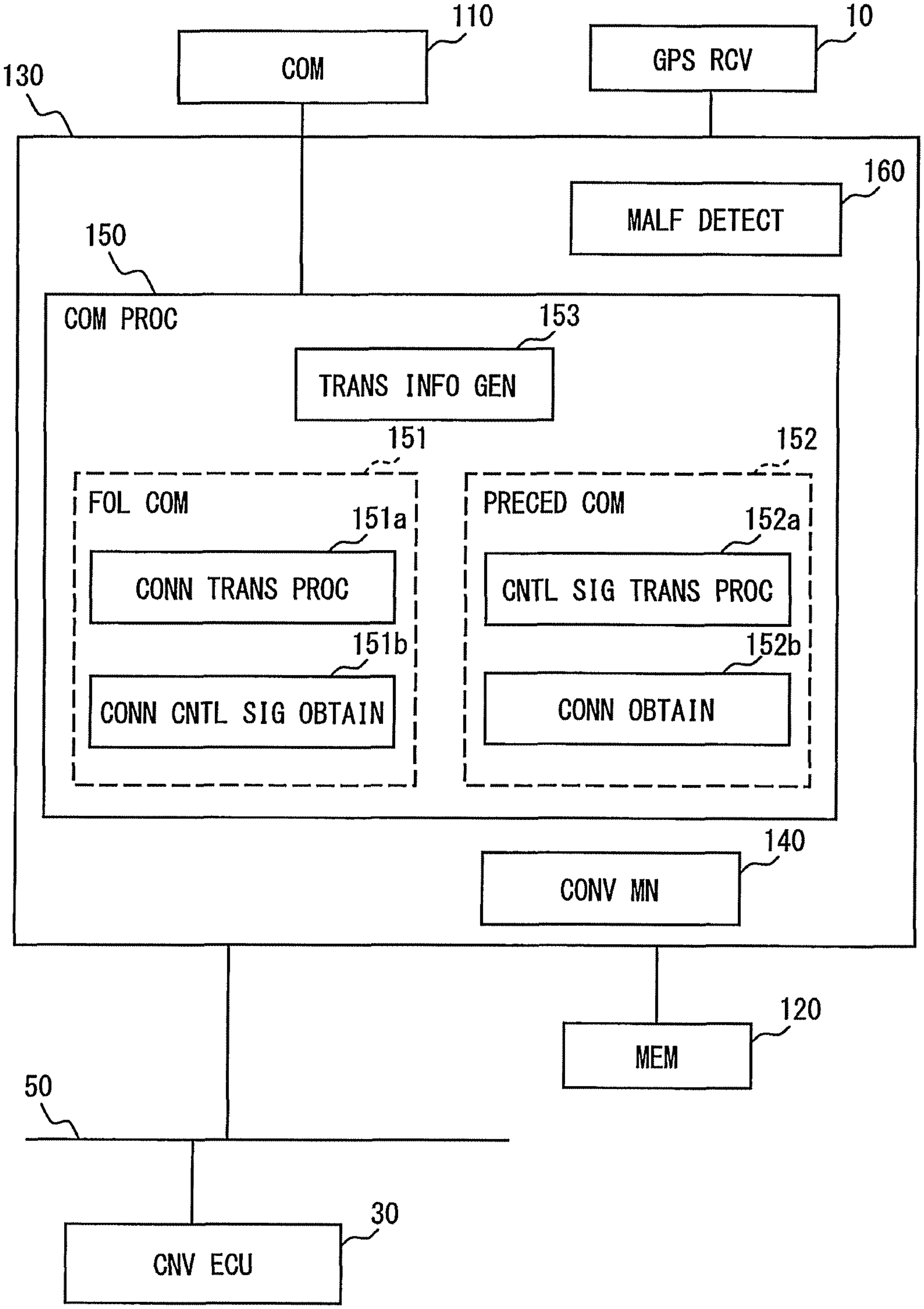
FIG. 3 is a block diagram illustrating a function of a communication ECU in a vehicle-to-vehicle communication device.

The communication ECU 130 corresponds to a computer internally having a CPU, a ROM, a RAM, or the like (not shown). The CPU uses a temporal memory function of the RAM, and executes a program stored in the ROM, so that the communication ECU 130 performs a function described in FIG. 3. Thus, the communication ECU 130 functions as a convoy management portion 140, a communication process portion 150, a malfunction detection portion 160. In other words, the communication ECU 130 corresponds to the convoy management portion 140, the communication process portion 150, and the malfunction detection portion 160.

The convoy management portion 140 updates convoy information of the subject vehicle. The convoy information includes the inter-vehicle distance to the preceding vehicle, a preceding vehicle connection mode, a follower vehicle connection mode, an order in a convoy (hereinafter, referred to as an in-convoy order). The updated convoy information is stored in the memory portion 120.

The communication process portion 150 includes a follower vehicle communication process portion 151 and a preceding vehicle communication process portion 152. The follower vehicle communication process portion 151 performs a process when the subject vehicle communicates as a follower vehicle. The preceding vehicle communication process portion 152 performs a process when the subject vehicle communicates as a preceding vehicle. For example, in a case where the subject vehicle is a vehicle C1 in FIG. 1, the follower vehicle communication process portion 151 of the subject vehicle performs communication between the subject vehicle C1 and a preceding vehicle C2. The preceding vehicle communication process portion 152 performs communication between the subject vehicle C1 and the follower vehicle C3. Hereinafter, it is supposed that the subject vehicle is the vehicle C1, the preceding vehicle is the vehicle C2, and the follower vehicle is the vehicle C3.

The follower vehicle communication process portion 151 includes a connection transmission process portion 151*a* and a connection control signal obtain portion 151*b*. The connection transmission process portion 151*a* is a process portion related to a signal transmission. The connection control signal obtain portion 151*b* is a process portion related to a signal receiving. The preceding vehicle communication process portion 152 includes a connection control signal transmission process portion 152*a* and a connection signal obtain portion 152*b*. The connection control signal transmission process portion 152*a* is a process portion related to a signal transmission. The connection signal obtain portion 152*b* is a process portion related to a signal receiving.

The follower vehicle communication process portion 151 will be explained. The connection transmission process portion 151*a* transmits a connection signal to a transmission information generation portion 153. The connection signal indicates that the subject vehicle C1 requests the preceding vehicle C2 to connect to the subject vehicle C1 and travel, or the subject vehicle C1 does not request a connection to the preceding vehicle C2. The transmission information generation portion 153 generates the vehicle mode notification information, which includes the connection signal and other predetermined information. The transmission information generation portion 153 broadcasts the vehicle mode notification information from the communication portion 110. The connection signal corresponds to a connection request signal that requests to connect and travel, and a connection non-request signal which indicates that a connection is not requested. The convoy travel ECU 30 determines which of the signal (i.e., the connection request signal and the connection non-request signal) is transmitted.

The preceding vehicle C2 also broadcasts the vehicle mode notification information of the preceding vehicle C2. The communication portion 110 of the subject vehicle C1 receives the vehicle mode notification information that the preceding vehicle C2 broadcasts.

The connection control signal obtain portion 151*b* obtains the connection control signal which is included in the vehicle mode notification information of the preceding vehicle C2. The vehicle mode notification information in this case is transmitted by the preceding vehicle C2, and received by the communication portion 110 of the subject vehicle C1. The connection control signal obtain portion 151*b* notifies the convoy travel ECU 30 of the connection control signal. The connection control signal indicates whether the preceding vehicle permits or not a connection to the follower vehicle (in a case where the preceding vehicle is the vehicle C2, the follower vehicle corresponds to the subject vehicle C1).

The preceding vehicle communication process portion 152 will be explained. The connection control signal transmission process portion 152*a* transmits the connection control signal to the transmission information generation portion 153. The connection control signal indicates whether the follower vehicle C3 is permitted to perform the connected travel or not. The connection control signal includes the connection permitting signal, which indicates that the connected travel by the follower vehicle C3 is permitted, and a connection rejection signal which indicates the connected travel is not permitted.

The connection signal obtain portion 152*b* obtains the connection signal which is included in the vehicle mode notification information of the follower vehicle C3. The vehicle mode notification information in this case is transmitted by the follower vehicle C3, and received by the communication portion 110 of the subject vehicle C1. The connection signal obtain portion 152*b* notifies the convoy travel ECU 30 of the connection signal. The connection signal corresponds to a connection request signal for requesting to connect and travel, and a connection non-request signal which indicates that a connection is not requested.

The malfunction detection portion 160 detects a malfunction affecting the connected travel. The connected travel requires a calculation of the inter-vehicle distance, and the calculation of the inter-vehicle distance requires receiving a signal from the GPS satellite. Therefore, the malfunction affecting the connected travel includes, for example, a case where a signal from the GPS satellite is not obtained for a certain period. The malfunction affecting the connected travel includes a malfunction of various drive associated devices or various braking associated devices. In addition, the malfunction affecting the connected travel includes an unstable behavior of the vehicle such as a skid, a spin, or the like. It may possible that the malfunction affecting the connected travel includes a lane change and an end of a convoy travel exclusive road. The malfunction detection portion 160 detects the malfunction from various signals obtained through an in-vehicle communication network like the CAN 50 or the like. When the malfunction detection portion 160 detects the malfunction, the malfunction detection portion 160 notifies the convoy travel ECU 30 of the malfunction.

The transmission information generation portion 153 obtains information from the follower vehicle communication process portion 151, the preceding vehicle communication process portion 152, the convoy management portion 140, the malfunction detection portion 160, or the like in the communication ECU 130, and from the convoy travel ECU 30. The transmission information generation portion 153 successively generates the vehicle mode notification information, and broadcasts the vehicle mode notification information from the communication portion 110.

A process which the communication ECU 130 executes will be explained with reference to FIG. 4. The communication ECU 130 executes the process described in FIG. 4 at constant cycles (e.g., 100 milliseconds) during vehicle traveling.

At step S1, the convoy management portion 140 in the communication ECU 130 obtains a signal from the GPS receiver 10 and, based on the signal, a present location (e.g., latitude, longitude, or the like) of the GPS receiver 10 is measured. The convoy management portion 140 stores the present location into the memory portion 120. The process is performed by the convoy management portion 140 in the communication ECU 130.

At step S2, the convoy management portion 140 obtains the inter-vehicle distance r (radar) to the preceding vehicle, which is measured, by the radar 20. The inter-vehicle distance r (radar) is stored into the memory portion 120. The process at step S2 is performed by the convoy management portion 140.

Step S3 corresponds to processes in the connection control signal obtain portion 151*b*, and the connection signal obtain portion 152*b*. At step S3, the communication ECU 130 obtains the vehicle mode notification information about a surrounding vehicle from the communication portion 110. The vehicle mode notification information is transmitted from the vehicle-to-vehicle communication device 100 which is mounted on the surrounding vehicle that exists around the subject vehicle. The vehicle mode notification information includes (i) the device ID of the vehicle-to-vehicle communication device 100 of the surrounding vehicle, (ii) the present location which the vehicle-to-vehicle communication device 100 measures by using the GPS receiver 10, the vehicle speed, the direction angle, the width of the vehicle, the length of the surrounding vehicle on which the vehicle-to-vehicle communication device 100 is mounted, the forward vehicle detection mode of the surrounding vehicle, the follower vehicle detection mode, the connection signal to a preceding vehicle, the connection control signal to a follower vehicle for the surrounding vehicle. In addition, when the forward vehicle detection mode is in a tracking mode, the vehicle mode notification information includes the device ID of the vehicle-to-vehicle communication device 100 of a preceding vehicle which the surrounding vehicle tracks. When the follower vehicle detection mode of the vehicle is in a track object mode, the vehicle mode notification information includes the device ID of the vehicle-to-vehicle communication device 100 of a follower vehicle by which the surrounding vehicle is followed.

At step S4, based on the inter-vehicle distance r (radar) calculated at step S2 and the vehicle mode notification information obtained at step S3, the convoy management portion 140 determines the forward vehicle detection mode. The forward vehicle detection mode corresponds to a mode where the subject vehicle detects the forward vehicle of the subject vehicle. Herein, the forward vehicle includes the preceding vehicle. The forward vehicle is a broader concept than the preceding vehicle. The preceding vehicle corresponds to a vehicle which travels on the same lane with the subject vehicle, and which travels immediately in front of the subject vehicle (i.e., another vehicle does not exist between the subject vehicle and the preceding vehicle). The forward vehicle corresponds to a vehicle which exists in front of the subject vehicle based on a traveling direction of the subject vehicle, and which travels, to the same direction of the subject vehicle. Incidentally, the same direction denotes that a traveling direction of another vehicle is not a direction opposite to the traveling direction of the subject vehicle, or is not a cross direction to the traveling direction of the subject vehicle. It is determined, according to the vehicle mode notification information which the surrounding vehicle transmits, whether a vehicle corresponds to the forward vehicle. Especially, the present location and the direction angle, which are included in the vehicle mode notification information, are used for determination. It can not accurately determine whether the vehicle travels in the same lane with the subject vehicle, according to the above information. Therefore, it is possible to include the vehicle traveling in a different lane from the subject vehicle.

Figure 5:
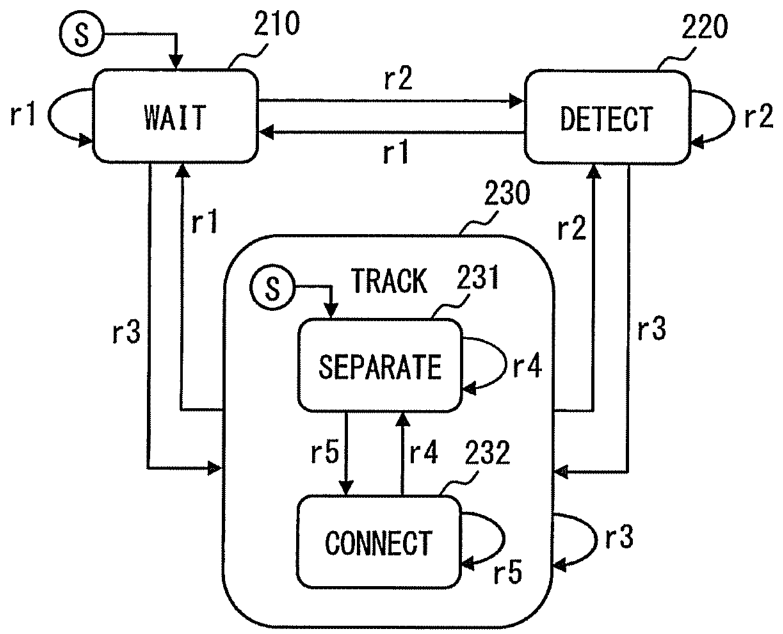
FIG. 5 is a drawing illustrating a forward vehicle detection mode.

The forward vehicle detection mode, as described in FIG. 5, is divided into a waiting mode 210, a detection mode 220, and a tracking mode 230. The tracking mode 230 includes a separation mode 231 and a connection mode 232 as a subdivision. In FIG. 5, a symbol "s" indicates an initial mode. Thus, an initial mode of the forward vehicle detection mode corresponds to the waiting mode 210.

In the waiting mode 210, the vehicle mode notification information from the forward vehicle is not received. In the detection mode 220, the vehicle mode notification information is received from at least one of the forward vehicles, but the preceding vehicle C2 has not been identified. In the tracking mode 230, the preceding vehicle C2 has been identified, and the subject vehicle C1 travels immediately behind the preceding vehicle C2. Incidentally, a phrase "immediately behind" denotes that another vehicle does not exist between the subject vehicle C1 and the preceding vehicle C2, and the inter-vehicle distance between the subject vehicle and the preceding vehicle C2 does not matter. In the separation mode 231, the preceding vehicle C2 is identified and travels immediately behind the preceding vehicle C2, but the convoy travel is not performed with the preceding vehicle C2. In the connection mode 232, the preceding vehicle C2 is identified, and the subject vehicle C1 performs the convoy travel with the preceding vehicle C2. Both the connection mode 232 and the separation mode 231 are a subdivision of the tracking mode 230. However, the inter-vehicle distance to the preceding vehicle C2 in the connection mode 232 is shorter than the inter-vehicle distance in the separation mode 231.

In FIG. 5, an arrow r1 indicates that a condition (a waiting mode condition) corresponding to the waiting mode 210 is satisfied. The waiting mode condition indicates a condition (corresponding to a waiting mode condition 1) where the subject vehicle does not receive the vehicle mode notification information from any surrounding vehicles for a predetermined period, or another condition (corresponding to a waiting mode condition 2) where the subject vehicle receives the vehicle mode notification information from at least one of the surrounding vehicles, but, according to contents of the vehicle mode notification information, it is possible to determine that the surrounding vehicle is not the preceding vehicle, for a predetermined period.

When the waiting mode condition 1 or the waiting mode condition 2 is satisfied in the waiting mode 210, the waiting mode 210 is kept. When the waiting mode condition 1 or the waiting mode condition 2 is satisfied in the detection mode 220 or the tracking mode 230, the forward vehicle detection mode is changed from the detection mode 220 or the tracking mode 230 to the waiting mode 210.

An arrow r2 indicates that a condition (a detection mode condition) corresponding to the detection mode 220 is satisfied. The detection mode condition indicates a condition where, although the subject vehicle receives the vehicle mode notification information from a surrounding vehicle and the surrounding vehicle is determined as a forward vehicle according to contents of the vehicle mode notification information, the preceding vehicle C2 can not be identified in a preceding vehicle identification process, which is described below. When the detection mode condition is satisfied in the detection mode 220, the detection mode 220 is kept. When the detection mode condition is satisfied in the waiting mode 210 or the tracking mode 230, the forward vehicle detection mode is changed from the waiting mode 210 or the tracking mode 230 to the detection mode 220.

An arrow r3 indicates that a condition (a tracking mode condition) corresponding to the tracking mode 230 is satisfied. The tracking mode condition indicates a condition where the subject vehicle C1 receives the vehicle mode notification information from the surrounding vehicle and the preceding vehicle C2 can be identified, according to contents of the vehicle mode notification information, by the preceding vehicle identification process. Incidentally, when the preceding vehicle C2 is identified in the preceding vehicle identification process, the subject vehicle C1 travels immediately behind the preceding vehicle C2. When the tracking mode condition is satisfied in the tracking mode 230, the tracking mode 230 is kept. When the tracking mode condition is satisfied in the waiting mode 210 or the detection mode 220, the forward vehicle detection mode is changed from the waiting mode 210 or the detection mode 220 to the tracking mode 230.

An arrow r4 indicates that a condition (a separation mode condition) corresponding to the separation mode 231 is satisfied. Incidentally, only when the forward vehicle detection mode is in the tracking mode 230, it is determined whether the separation mode condition is satisfied. The separation mode condition indicates a condition (corresponding to a separation mode condition 1) where the connection signal, which is transmitted to the preceding vehicle C2, is the connection non-request signal, indicating that the connection is not requested, or another condition (corresponding to a separation mode condition 2) where the connection request signal as the connection signal is transmitted to the preceding vehicle C2 and the connection control signal which is received from the preceding vehicle C2 indicates the connection rejection signal.

When the separation mode condition is satisfied in the separation mode 231, the separation mode 231 is kept. When the separation mode condition is satisfied in the connection mode 232, the forward vehicle detection mode is changed to the separation mode 231. In addition, an initial mode, when the forward vehicle detection mode is changed from another mode to the tracking mode 230, is the separation mode 231.

An arrow r5 indicates that a condition (a connection mode condition) corresponding to the connection mode 232 is satisfied. Only when the forward vehicle detection mode is in the tracking mode 230, it is determined whether the connection mode condition is satisfied. The connection mode condition indicates a condition where the subject vehicle C1 transmits the connection request signal to the preceding vehicle C2, and the connection permitting signal is obtained from the preceding vehicle C2.

Figure 7:
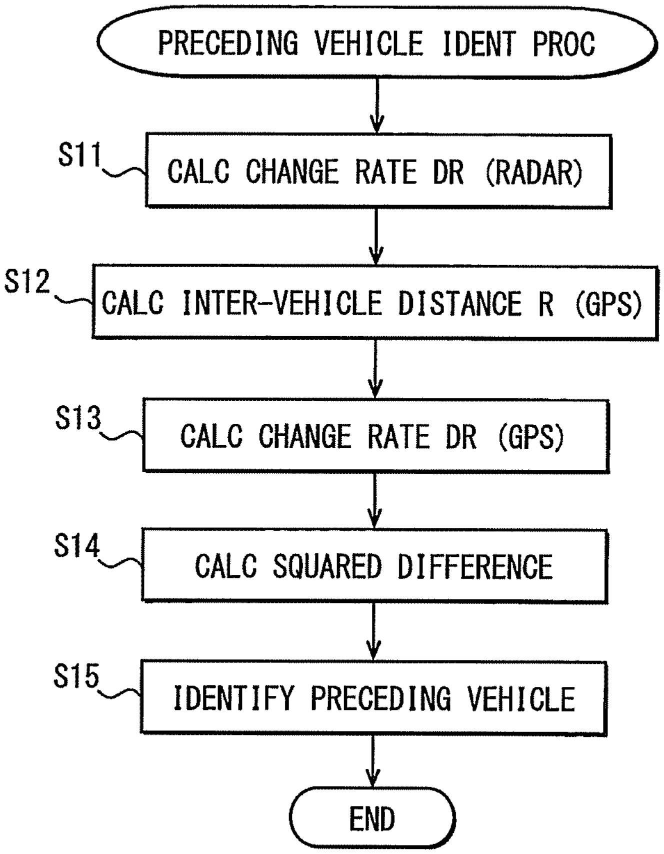
FIG. 7 is a drawing illustrating a preceding vehicle identification process.

The preceding vehicle identification process will be explained with reference to FIG. 7. At step S11, a change rate dr (radar) of the inter-vehicle distance is calculated by the inter-vehicle distance r (radar), which is periodically obtained by executing the step S2 in FIG. 4.

At step S12, the communication ECU 130 calculates a difference between the GPS information (corresponding to latitude and longitude) included in the vehicle mode notification information, which is obtained at step S3, of the surrounding vehicle and the present location (corresponding to latitude and longitude) that the subject vehicle C1 measures at step S1. A calculation result is determined as an inter-vehicle distance r (GPS) between the subject vehicle and the surrounding vehicle. When multiple vehicle mode notification informations are obtained from multiple surrounding vehicles, the inter-vehicle distance r (GPS) is calculated for each vehicle. Incidentally, it is determined by the device ID included in the vehicle mode notification information, whether multiple vehicle mode notification information are transmitted from one same vehicle or different vehicles. The memory portion 120 stores the inter-vehicle distance r (GPS) calculated for each vehicle.

At step S13, by referring the inter-vehicle distance r (GPS) which is periodically calculated and stored by executing the step S12, a change rate dr (GPS) of the inter-vehicle distance r (GPS) is calculated for each vehicle.

At step S14, a squared difference $d^2$ for each vehicle is calculated with an expression 1 described in FIG. 11. The squared difference $d^2$ indicates a difference between the inter-vehicle distance r (radar) and the inter-vehicle distance r (GPS), a difference between the change rate dr (radar) of the inter-vehicle distance r (radar) and the change rate dr (GPS) of the inter-vehicle distance r (GPS), and a lateral directional offset LatOffset, as a whole. The lateral directional offset LatOffset indicates a distance between the surrounding vehicle and a traveling direction of the subject vehicle C1 in a lateral direction, and is calculated from the GPS information and the direction angle.

At step S15, the communication ECU 130 determines whether the vehicle mode notification information is included or not so that the squared difference $d^2$ calculated at step S14 is less than a predetermined threshold value. When the vehicle mode notification information that the squared difference $d^2$ is less than a predetermined threshold value is not included, it is determined that the preceding vehicle C2 can not identified. When the vehicle mode notification information that the squared difference $d^2$ is less than a predetermined threshold value is included, the vehicle that has transmitted the vehicle mode notification information is supposed as the preceding vehicle C2. However, since the vehicle mode notification information does not include a vehicle ID, the preceding vehicle C2 is identified by setting the device ID of the vehicle mode notification information as the device ID of the vehicle-to-vehicle communication device 100 which is mounted on the preceding vehicle C2. Incidentally, in addition to the squared difference $d^2$, in a process at step S15, a condition whether a traveling direction is the same direction to the subject vehicle C1, or whether the vehicle mode notification information is obtained at or less than regular intervals may be considered to identify the preceding vehicle C2.

Figure 4:
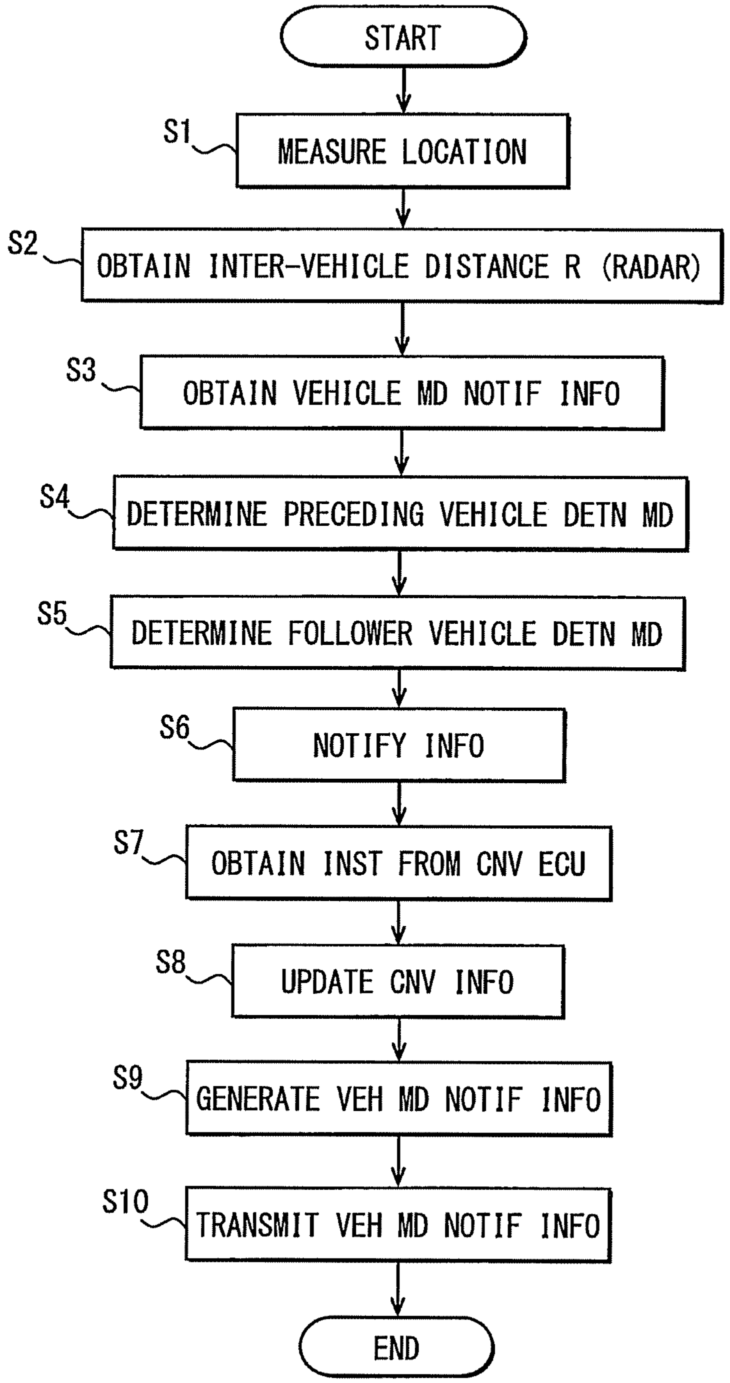
FIG. 4 is a flowchart illustrating an essential process performed by the communication ECU.
Figure 6:
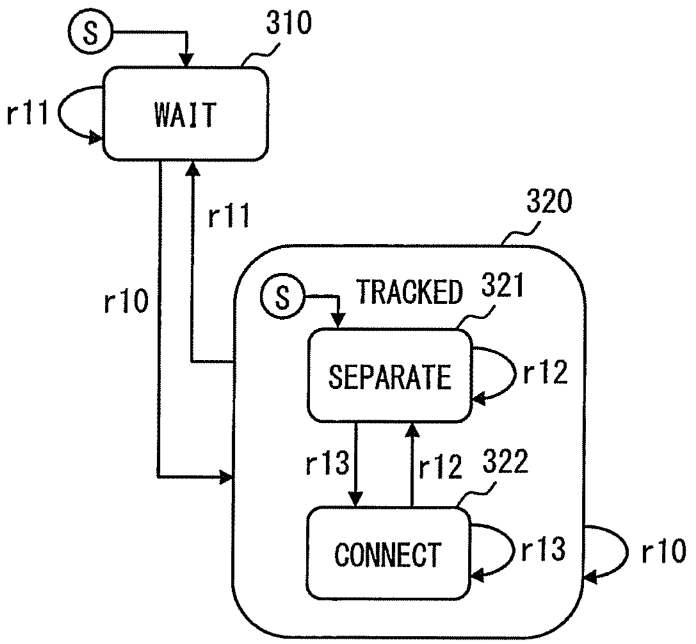
FIG. 6 is a drawing illustrating a follower vehicle detection mode.

At step S5 in FIG. 4, the communication ECU 130 determines a follower vehicle detection mode in which the subject vehicle C1 detects the follower vehicle C3. Herein, the follower vehicle C3 follows the subject vehicle C1. Especially, the convoy management portion 140 performs the process for determining the follower vehicle detection mode. The follower vehicle detection mode is, as described in FIG. 6, divided into a waiting mode 310 and a track object mode 320. In addition, the track object mode 320 has a separation mode 321 and a connection mode 322 as subdivisions. In FIG. 6, a symbol "s" indicates an initial setting mode.

The track object mode 320 indicates a mode in which the subject vehicle C1 detects that the follower vehicle C3 travels and follows the subject vehicle C1, corresponding to the preceding vehicle. Incidentally, the follower vehicle C3 corresponds to a vehicle which travels immediately behind the subject vehicle C1 in the same lane with the subject vehicle C1. When the follower vehicle detection mode does not correspond to the track object mode 320, the follower vehicle detection mode corresponds to the waiting mode 310. The separation mode 321 is included in the track object mode 320, and corresponds to a mode where the subject vehicle C1 does not perform the convoy travel with the follower vehicle C3. The connection mode 322 corresponds to a mode where the subject vehicle C1 identifies the follower vehicle C3, and performs the convoy travel with the follower vehicle C3.

In FIG. 6, an arrow r10 indicates that a condition (a track object mode condition) corresponding to the track object mode 320 is satisfied. The track object mode condition indicates a condition where the subject vehicle C1 can obtain the vehicle mode notification information from the follower vehicle C3, the forward vehicle track mode, which is included in the vehicle mode notification information, corresponds to the tracking mode 230, and it is possible to determine that a vehicle followed by the follower vehicle C3 is the subject vehicle C1. When the track object mode condition is satisfied in the waiting mode 310, the follower vehicle detection mode is changed to the track object mode 320. When the track object mode condition is satisfied in the track object mode 320, the track object mode 320 is kept.

An arrow r11 indicates that a condition (a waiting mode condition) corresponding to the waiting mode 310 is satisfied. The waiting mode condition indicates one of conditions where (1) the vehicle mode notification information is not received from any vehicles for a predetermined period, (2) although the subject vehicle C1 receives the vehicle mode notification information, the forward vehicle detection mode included in the received vehicle mode notification information is not the tracking mode 230, and (3) although the subject vehicle C1 receives the vehicle mode notification information and the forward vehicle detection mode included in the received vehicle mode notification information is the tracking mode 230, the device ID for identifying the forward vehicle which the vehicle tracks does not match not the device ID of the subject vehicle C1. When the waiting mode condition is satisfied in the track object mode 320, the waiting mode 310 is kept. When the waiting mode condition is satisfied in the track object mode 320, the follower vehicle detection mode is changed to the track object mode 320.

An arrow r12 indicates that a condition (a separation mode condition) corresponding to the separation mode 321 is satisfied. Only when the follower vehicle detection mode is in the track object mode 320, it is determined whether the separation mode condition is satisfied. The separation mode condition indicates a condition (corresponding to a separation mode condition 1) where the subject vehicle C1 does not receive the connection request signal from the follower vehicle C3, or another condition (corresponding to a separation mode condition 2) where, although the connection request signal is received from the follower vehicle C3, the subject vehicle C1 does not transmit the connection permitting signal to the follower vehicle C3.

When the separation mode condition is satisfied in the separation mode 321, the separation mode 321 is kept. When the separation mode condition is satisfied in the connection mode 322, the follower vehicle detection mode is changed to the separation mode 321. In addition, the initial setting mode when the follower vehicle detection mode is changed from the waiting mode 310 to the track object mode 320 corresponds to the separation mode 321.

An arrow r13 indicates that a condition (a connection mode condition) corresponding to the connection mode 322 is satisfied. Only when the follower vehicle detection mode is in the track object mode 320, it is determined whether the connection mode condition is satisfied. The connection mode condition indicates a condition where the connection request signal is received from the follower vehicle C3, and where the subject vehicle C1 transmits the connection permitting signal to the follower vehicle C3. When the connection mode condition is satisfied in the separation mode 321, the follower vehicle detection mode is changed to the connection mode 322. When the connection mode condition is satisfied in the connection mode 322, the connection mode 322 is kept.

Step S6 corresponds to the connection control signal obtain portion 151*b* and the connection signal obtain portion 152*b*. At step S6, through CAN 50, the convoy travel ECU 30 is notified of the connection signal to the preceding vehicle for the surrounding vehicle and the connection control signal to the follower vehicle. The connection signal and the connection control signal are included in the vehicle mode notification information, which is obtained at step S3, of the surrounding vehicle. In addition, the convoy travel ECU 30 is notified of the forward vehicle detection mode and the follower vehicle detection mode determined at step S4 and step S5.

When the convoy travel ECU 30 obtains the connection request signal from the follower vehicle C3 which sets the subject vehicle C1 as the preceding vehicle, as a response to the connection request signal, the convoy travel ECU 30 outputs the connection instruction or the separation instruction for the follower vehicle C3 to the communication ECU 130. It is determined which of the connection instruction and the separation instruction is outputted, according to a malfunction notification from the malfunction detection portion 160 or a user setting. When the user setting instructs a separation or a malfunction is notified, the convoy travel ECU 30 outputs the separation instruction. When the user setting permits a connection and the malfunction is not notified, the convoy travel ECU 30 outputs the connection instruction.

When the forward vehicle detection mode corresponds to the tracking mode 230, the convoy travel ECU 30 determines whether the subject vehicle C1 connects to the preceding vehicle or separates from the preceding vehicle. The convoy travel ECU 30 outputs the connection instruction or the separation instruction for the preceding vehicle to the communication ECU 130. The user setting determines which of the connection instruction and the separation instruction is outputted.

At step S7, the communication ECU 130 obtains an instruction, which is determined by the convoy travel ECU 30, related to the convoy travel. The instruction corresponds to the connection instruction/the separation instruction for the preceding vehicle or the follower vehicle. The convoy management portion 140 performs step S7 and step S8.

At step S8, the convoy information is updated. Only when the convoy travel is performed, the convoy information is updated. The convoy information includes the preceding vehicle connection mode and the follower vehicle connection mode. The preceding vehicle connection mode corresponds to either the separation mode 231 or the connection mode 232 in FIG. 5. The follower vehicle connection mode corresponds to either the separation mode 321 or the connection mode 322 in FIG. 6. A determination of each of the preceding vehicle connection mode and the follower vehicle connection mode is based on the instruction obtained at step S7, the vehicle mode notification information of the subject vehicle which is broadcasted previously, and the conditions described in FIG. 5 and FIG. 6.

The convoy information includes, in addition to the preceding vehicle connection mode and the follower vehicle connection mode, an order in a convoy from a top of the convoy, an order in the convoy from an end of the convoy, an ID of the identified preceding vehicle and an ID of the identified follower vehicle. The order from the top of the convoy corresponds to a value which is added one to the order from the top of the convoy including the identified preceding vehicle. The order from the end of the convoy corresponds to a value which is added one to the order from the end of the convoy including the identified follower vehicle. Incidentally, the order from the top of the convoy including the preceding vehicle and the order from the end of the convoy including the follower vehicle is respectively included in the subject vehicle notification information that the preceding vehicle and the follower vehicle transmits.

At step S9, the transmission information generation portion 153 performs the process, and generates the vehicle mode notification information. The vehicle mode notification information, as explained at step S3, includes the device ID of the vehicle-to-vehicle communication device 100, the present location, the vehicle speed, the direction angle, the width of the vehicle, the length of the vehicle, the forward vehicle detection mode, the follower vehicle detection mode, the device ID of the vehicle-to-vehicle communication device which is mounted on the forward vehicle that the subject vehicle tracks, the device ID of the vehicle-to-vehicle communication device which is mounted on the follower vehicle that follows the subject vehicle, the convoy information updated at step S8, the connection signal for the preceding vehicle, and the connection control signal for the follower vehicle. When the instruction for the preceding vehicle outputted from the convoy travel ECU 30 corresponds to the connection instruction, the connection signal for the preceding vehicle is the connection request signal. When the instruction to the preceding vehicle outputted from the convoy travel ECU 30 corresponds to the separation instruction, the connection signal for the preceding vehicle is the connection non-request signal. The connection control signal for the follower vehicle, when the instruction for the follower vehicle outputted from the convoy travel ECU 30 corresponds to the connection instruction, is the connection permitting signal. The connection control signal for the follower vehicle, when the instruction for the follower vehicle corresponds to the separation instruction, is the connection rejection signal.

At step S10, the vehicle mode notification information, which is generated at step S9, is circumferentially transmitted from the communication portion 110 in the broadcast method. A surrounding vehicle receives the vehicle mode notification information transmitted at step S10, and the process described in FIG. 4 is performed in the surrounding vehicle by using the vehicle-to-vehicle communication device 100. Based on the forward vehicle detection mode of the vehicle and the follower vehicle detection mode of the vehicle, which have transmitted each vehicle mode notification information, the surrounding vehicle determines the forward vehicle detection mode and the follower vehicle detection mode. In addition, it is possible that various on-vehicle devices mounted on the surrounding vehicle perform a control according to the forward vehicle detection mode and the follower vehicle detection mode of the subject vehicle.

A control process explained in FIG. 4 will be explained with reference to a sequence drawing described in FIG. 8. An example in FIG. 8 explains a control process, of the communication ECU 130 and the convoy travel ECU 30 of the convoy travel control device 1 that is mounted on each of the subject vehicle C1, the preceding vehicle C2, and the follower vehicle C3. Furthermore, the example in FIG. 8 mainly explains the communication ECU 130 and the convoy travel ECU 30 of the subject vehicle C1.

Figure 8:
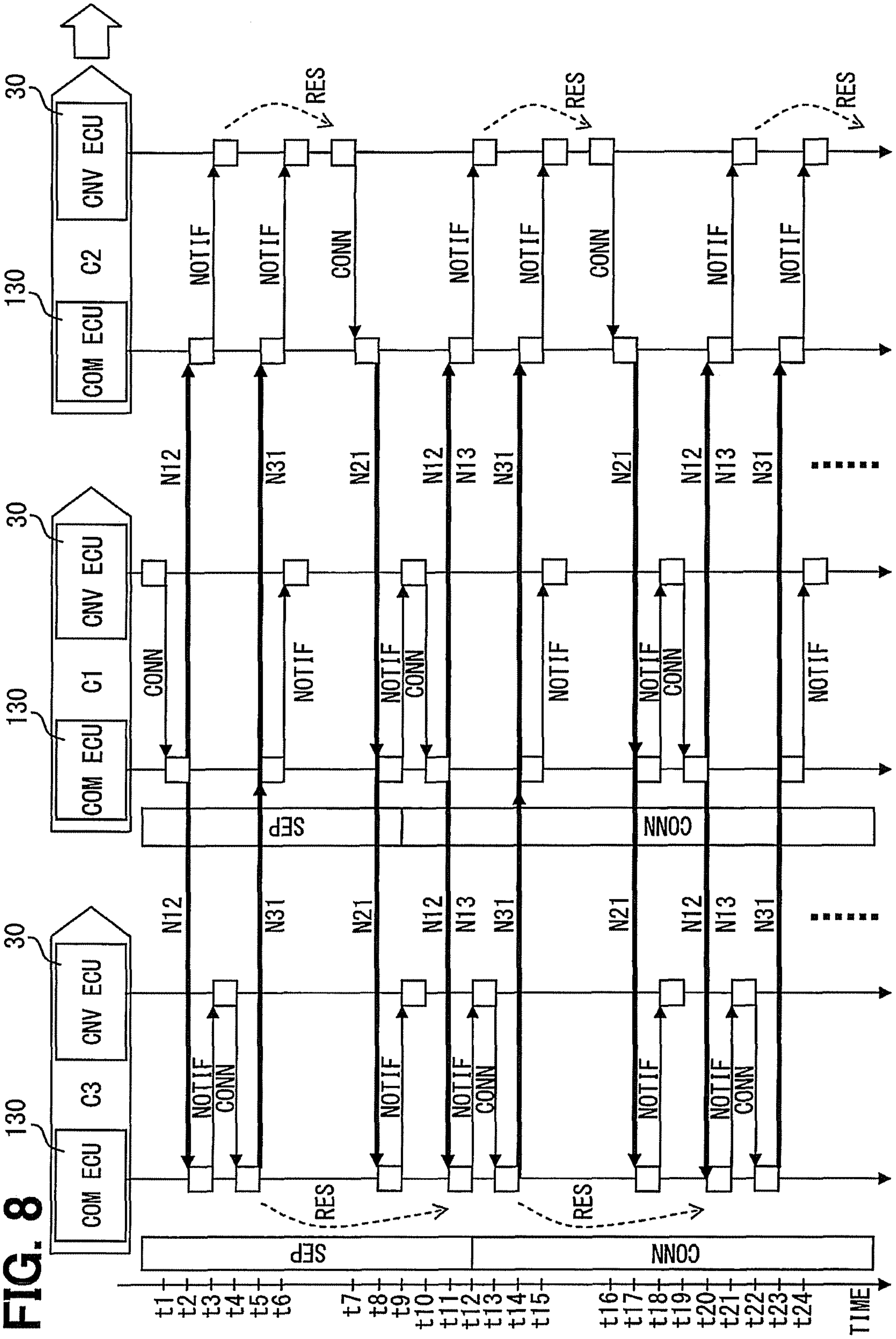
FIG. 8 is a sequence diagram illustrating a control of the communication ECU and a convoy travel ECU.

In FIG. 8, a longitudinal axis at the most left side corresponds to a time axis. A longitudinal rectangle drawing placed at the right of the time axis indicates the forward vehicle detection stats of the follower vehicle C3. Another longitudinal rectangle drawing whose position in a horizontal direction substantially gathers an end of a drawing, representing the subject vehicle C1, indicates the forward vehicle detection mode of the subject vehicle C1. A symbol "N" indicates the vehicle mode notification information. The first number following N indicates a transmission source of the vehicle mode notification information, and the second number indicates a destination Of the vehicle mode notification information. Incidentally, since the vehicle mode notification information is transmitted in the broadcast method, a vehicle other than the destination of the information also receives the vehicle mode notification information. It is supposed that the subject vehicle C1 approaches the preceding vehicle C2, the follower vehicle C3 approaches the subject vehicle C1, and, when a condition is satisfied, each of the vehicles C1 to C3 can connect each other.

In the example in FIG. 8, the convoy travel ECU 30 of the subject vehicle C1 outputs the connection instruction, which instructs a connection with the preceding vehicle C2, to the communication ECU 130 at time t1. In response to the instruction, the communication ECU 130 broadcasts the vehicle mode notification information N12 including the connection request signal with the preceding vehicle C2 at time t2. The vehicle mode notification information N12 includes an in-convoy order 1 (1). Incidentally, a number following a phrase "in-convoy order" indicates an order from a top in the convoy, another number in parentheses next to the above number indicates an order from an end in the convoy. At time t2, since the subject vehicle C1 has not performed the convoy travel with the preceding vehicle C2 or the follower vehicle C3, the in-convoy order corresponds to 1 (1).

The vehicle mode notification information N12 is received by the communication ECU 130 of the preceding vehicle C2 and the communication ECU 130 of the follower vehicle C3. Each of the two communication ECUs 130 notifies the convoy travel ECU of information, which is determined based on the received vehicle mode notification information, such as the in-convoy order (at time t3).

At time t4, the convoy travel ECU 30 of the follower vehicle C3 outputs the connection instruction which connects with the preceding vehicle (in this case, the preceding vehicle for the follower vehicle C3 corresponds to the subject vehicle C1) to the communication ECU 130.

At time t5, the communication ECU 130 of the follower vehicle C3 broadcasts the vehicle mode notification information N31. The vehicle mode notification information N31 includes the connection request signal, which requests the connected travel with the subject vehicle C1 and the in-convoy order 1 (1). In this case, the subject vehicle C1 corresponds to the preceding vehicle for the follower vehicle C3. The vehicle mode notification information N31 is obtained by each communication ECU 130 of the subject vehicle C1 and the preceding vehicle C2, through the communication portion 110 of each of the vehicles C1, C2.

The communication ECU 130 of each of the subject vehicle C1 and the preceding vehicle C2 notifies the convoy travel ECU 30 of information, which is determined based on the vehicle mode notification information N31 (at time t6).

At time t7, the convoy travel ECU 30 of the preceding vehicle C2 outputs, as a response to the connection request signal obtained at time t3, the connection instruction for the subject vehicle C1.

The communication ECU 130 of the preceding vehicle C2 broadcasts the vehicle mode notification information N21, which includes a connection permitting signal for the subject vehicle C1 (at time t8). At this time (i.e., at time t8), since the subject vehicle C1 and the preceding vehicle C2 have performed the connection request and the connection permission as a response to the connection request, the preceding vehicle C2 detects the subject vehicle C1 as a vehicle included in the same convoy with the preceding vehicle C2. In other words, the preceding vehicle C2 determines that the preceding vehicle C2 is placed in a second position from the end of the convoy. Thus, the in-convoy order included in the vehicle mode notification information transmitted at time t8 represents 1 (2). The forward vehicle detection mode of the subject vehicle C1 is changed from the separation mode 231 to the connection mode 232 in the tracking mode 230. The follower vehicle C3, in addition to the subject vehicle C1, receives the vehicle mode notification information N21 broadcasted at time t8.

The communication ECU 130 of each of the subject vehicle C1 and the follower vehicle C3 notifies the convoy travel ECU 30 of information, which is determined based on the vehicle mode notification information N21 obtained at time t8 (at time t9).

At time t10, the convoy travel ECU 30 of the subject vehicle C1 outputs the connection instruction for the preceding vehicle C2 and for the follower vehicle C3 to the communication ECU 130 of the subject vehicle C1. The connection instruction for the follower vehicle C3 corresponds to a response to the connection request signal from the follower vehicle C3, which is obtained at time t6.

At time t11, the communication ECU 130 of the subject vehicle C1, based on the instruction received at time t10, broadcasts the vehicle mode notification informations N12, N13, which include the connection request signal for the preceding vehicle C2 and the connection permitting signal for the follower vehicle C3. At this time (i.e., at time t11), since the subject vehicle C1 and the follower vehicle C3 have performed the connection request and the connection permission as a response to the connection request, the subject vehicle C1 detects the follower vehicle C3 as a vehicle included in the same convoy with the subject vehicle C1. Thus, the in-convoy order included in the vehicle mode notification informations N12, N13 transmitted at time t11 represents 2 (2).

The vehicle mode notification informations N12, N13 are obtained by the communication ECU 130 of each of the preceding vehicle C2 and the follower vehicle C3, through the communication portion 110. As a result, the follower vehicle C3 detects that the follower vehicle C3 travels immediately behind the subject vehicle C1 in the same convoy with the subject vehicle C1, and that the follower vehicle C3 is placed at the end of the convoy. Thus, the follower vehicle C3 detects that the in-convoy order represents 3 (1). In addition, since the in-convoy order of the subject vehicle C1 corresponds to a second from the end of the convoy, the in-convoy order from the end of the convoy in the preceding vehicle C2 is updated to three by adding 1 to 2. The forward vehicle detection mode of the follower vehicle C3 is changed from the separation mode 231 to the connection mode 232 in the tracking mode 230.

The communication ECU 130 of each of the follower vehicle C3 and the subject vehicle C1 notifies the convoy travel ECU 30 in the vehicles C1, C3 of information, which is determined based on the vehicle mode notification informations N12, N13 (at time t12).

At time t13, the convoy travel ECU 30 of the follower vehicle C3 outputs the connection instruction for the subject vehicle C1 to the communication ECU 130 of the follower vehicle C3. At time t14, the communication ECU 130 of the follower vehicle C3 broadcasts the vehicle mode notification information N31 including the connection request signal. The connection request signal requests the connected travel with the subject vehicle C1. The vehicle mode notification information N31 includes the in-convoy order 3 (1).

The vehicle mode notification information N31 is received by the preceding vehicle C2, in addition to the subject vehicle C1. At time t15, the communication ECU 130 of each of the subject vehicle C1 and the preceding vehicle C2 notifies the convoy travel ECU 30 in each of the vehicles C1, C2 of information, which is determined based on the vehicle mode notification information N31.

Processes in the convoy travel ECU 30 and the communication ECU 130 of each of the vehicles C1, C2, C3 at time t16 to time t24 are the same with the processes at time t7 to time t15. In other words, the convoy travel ECU 30 and the communication ECU 130 of each of the vehicles C1, C2, C3 periodically receive and transmit the vehicle mode notification information including the connection request signal and/or the connection permitting signal during the connected travel, and periodically perform an update of the in-convoy order, for example.

Figure 9:
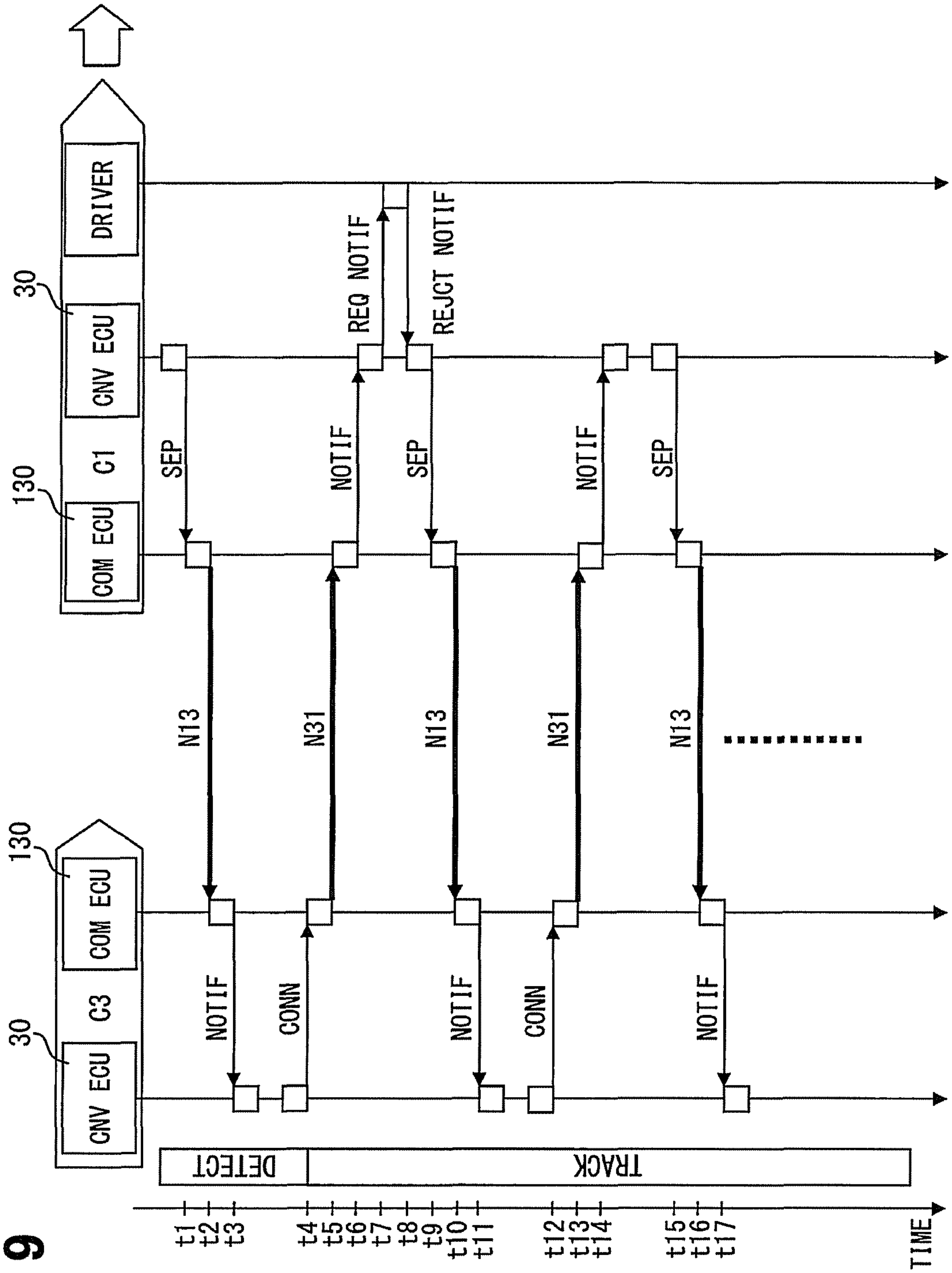
FIG. 9 is a sequence diagram illustrating a control of the communication ECU and a convoy travel ECU.

Another example will be explained with reference to FIG. 9. The example in FIG. 9 represents a case where the follower vehicle C3 transmits the connection request to the subject vehicle C1, but the subject vehicle C1 rejects the connection according to a decision of a driver. A manner to read the drawing in FIG. 9 is similar to FIG. 8. In addition, it is supposed that the follower vehicle C3 approaches to the subject vehicle C1.

At time t1, the convoy travel ECU 30 of the subject vehicles C1 outputs the separation instruction to the communication ECU 130. The separation instruction corresponds to an initial setting.

At time t2, the communication ECU 130 of the subject vehicle C1, according to the instruction from the convoy travel ECU 30, broadcasts the vehicle mode notification information N13 including the connection rejection signal. The in-convoy order included in the vehicle mode notification information represents 1 (1). The follower vehicle C3 receives the vehicle mode notification information N13.

At time t3, the communication ECU 130 of the follower vehicle C3 notifies the convoy travel ECU 30 of information, which is determined based on the received vehicle mode notification information. The information includes the in-convoy order 1 (1), for example.

At time t4, the convoy travel ECU 30 of the follower vehicle C3 outputs the connection instruction to the preceding vehicle (i.e., in this case, the preceding vehicle corresponds to the subject vehicle C1) for the follower vehicle C3. At time t5, the communication ECU 130 of the follower vehicle C3 broadcasts the vehicle mode, notification information N31. The vehicle mode notification information N31 includes the connection request signal for the subject vehicle C1, which corresponds to the preceding vehicle for the follower vehicle C3, and the in-convoy order 1 (1). The communication ECU 130 of the subject vehicle C1 obtains the vehicle mode notification information N31 through the communication portion 110.

At time t6, the communication ECU 130 of the subject vehicle C1 notifies the convoy travel ECU 30 of information, which is determined based on the vehicle mode notification information N31. This notification represents that the follower vehicle C3 has transmitted the connection request signal to the subject vehicle C1. The convoy travel ECU 30 of the subject vehicle C1, when the connection signal from the follower vehicle C3 is changed from the connection non-request signal to the connection request signal, notifies the driver that the follower vehicle C3 requests the connected travel (at time t7). A notification method may be turning on a follower vehicle indicator, for example.

The driver instructs whether the connection with the follower vehicle C3 is permitted or rejected for the notification. Incidentally, it is possible that, before the notification, from the follower vehicle C3 which requests the connected travel, the driver sets an instruction for the notification in advance. For example, since the inter-vehicle distance to the follower vehicle C3 in the connected travel is shorter than the normal travel, a driver may have a psychological oppressive feeling. In this case, it may be possible that the driver who has the psychological oppressive feeling sets a condition where the connected travel is rejected, in advance.

At time t8, when the instruction is set in advance, as described in FIG. 9, the instruction for the notification is immediately outputted to the convoy travel ECU 30 from the driver (accurately, with referring to a setting condition that the driver has set in advance).

When the convoy travel ECU 30 receives the instruction from the driver, the convoy travel ECU 30 outputs one instruction (the separation instruction in FIG. 9) of the connection instruction and the separation instruction, which is determined by the instruction from the driver to the communication ECU 130 (at time t9).

The communication ECU 130, in response to the separation instruction, broadcasts the vehicle mode notification information N13 including the connection rejection signal (at time t10). The vehicle mode notification information N13 is received by the follower vehicle C3. Incidentally, since the subject vehicle C1 rejects the connection, the in-convoy order included in the vehicle mode notification information N13 remains 1 (1), which is the same at time t2.

The communication ECU 130 of the follower vehicle C3 notifies the convoy travel ECU 30 in the follower vehicle C3 of information, which is determined based on the vehicle mode notification information N13 obtained at time t10 (at time t11). The convoy travel ECU 30 notifies a driver of the follower vehicle C3 that the preceding vehicle (corresponding to the subject vehicle C1 in this case) has notified a connection rejection.

After the notification, when the driver of the follower vehicle C3 again instructs the connection with the preceding vehicle (corresponding to the subject vehicle C1 in this case), or unless the driver of the follower vehicle C3 instructs that the connection is not required, the convoy travel ECU 30 of the follower vehicle C3 outputs the connection instruction to the communication ECU 130 (at time t12). Herein, the connection instruction is addressed to the preceding vehicle (corresponding to the subject vehicle C1) for the follower vehicle C3. As is the case with time t5, the communication ECU 130 of the follower vehicle C3 broadcasts the vehicle mode notification information N31 (at time t13). The vehicle mode notification information N31 includes the connection request signal for the subject vehicle C1 and the in-convoy order 1 (1). The communication ECU 130 of the subject vehicle C1 obtains the vehicle mode notification information N31 through the communication portion 110.

At time t14, the communication ECU 130 of the subject vehicle C1 notifies the convoy travel ECU 30 of information which is determined based on the vehicle mode notification information N31. This notification represents that the follower vehicle C3 has transmitted the connection request signal to the subject vehicle C1. However, at time t7, since it is confirmed that an intention of the driver of the subject vehicle C1 corresponds to the connection rejection, the convoy travel ECU 30 outputs the separation instruction to the communication ECU 130 without confirming the intention of the driver in this time (at time t15).

The communication ECU 130 which received the separation instruction broadcasts the vehicle mode notification information N13 including the connection rejection signal (at time t16). The follower vehicle C3 receives the vehicle mode notification information N13. The in-convoy order, which is included in the vehicle mode notification information N13, remains 1 (1).

The communication ECU 130 of the follower vehicle C3 notifies the convoy travel ECU 30 of information, which is determined based on the vehicle mode notification information N13 obtained at time t16 (at time t17). The convoy travel ECU 30, similar to time t11, notifies the driver that the preceding vehicle (corresponding to the subject vehicle C1 in this case) has notified the connection rejection. The following processes are similar to the processes after time t12.

As described above, in the present embodiment, even when the follower vehicle C3 approaches to the subject vehicle C1 and it is possible that the follower vehicle C3 performs the connected travel with the subject vehicle C1, which corresponds to the preceding vehicle, in a case where a response of the subject vehicle C1 for the connection request signal, which the follower vehicle C3 has transmitted, represents the connection rejection signal, the follower vehicle C3 does not perform the connected travel with the subject vehicle C1, which corresponds to the preceding vehicle. In the example in FIG. 9, the driver of the subject vehicle C1 can instruct whether the connected travel with the follower vehicle C3 is permitted. Therefore, it is possible that the driver who has a psychological oppressive feeling by the connected travel instructs the connection rejection and that the follower vehicle C3 is not caused to perform the connected travel.

Figure 10:
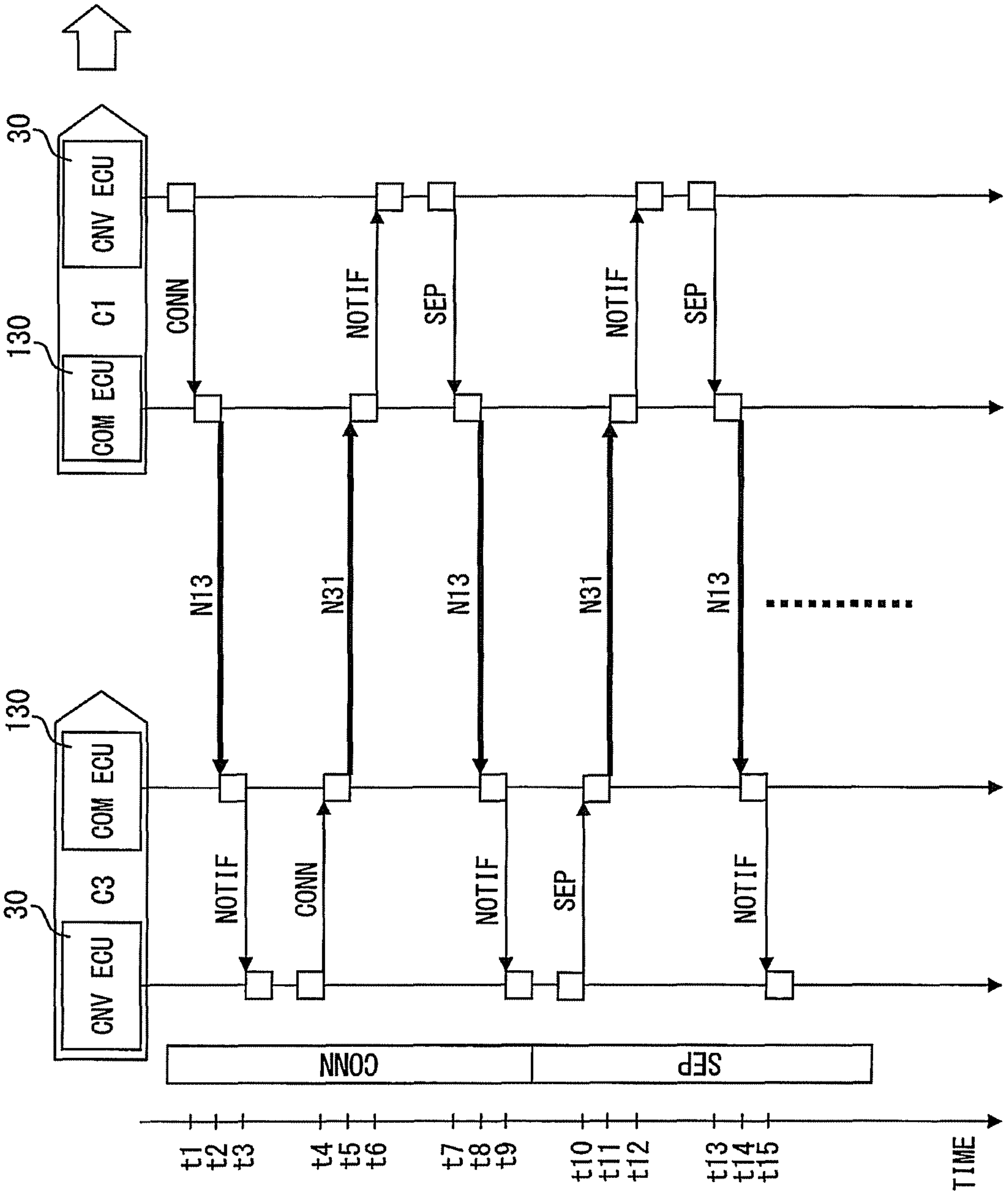
FIG. 10 is a sequence diagram illustrating a control of the communication ECU and a convoy travel ECU.

An example will be explained with reference to FIG. 10. The example in FIG. 10 represents a case where, although the follower vehicle C3 and the subject vehicle C1 have performed the connected travel, the subject vehicle C1 detects a malfunction that may affect the connected travel and the subject vehicle C1, which corresponds to the preceding vehicle for the follower vehicle C3, instructs the separation of the connected travel to the follower vehicle C3. A manner to read the drawing in FIG. 10 is similar to FIG. 8 and FIG. 9. In addition, it is supposed that the follower vehicle C3 approaches to the subject vehicle C1.

At time t1, the convoy travel ECU 30 of the subject vehicle C1 outputs the connection instruction to the communication ECU 130. At time t2, the communication ECU 130 of the subject vehicle C1, according to the instruction from the convoy travel ECU 30, broadcasts the vehicle mode notification information N13 including the connection permitting signal. The example in FIG. 10 represents that the subject vehicle C1 and the follower vehicle C3 perform the connected travel at time t1, and the in-convoy order included in the vehicle mode notification information indicates 1 (2). The follower vehicle C3 receives the vehicle mode notification information N13.

At time t3, the communication ECU 130 of the follower vehicle C3 notifies the convoy travel ECU 30 of information, which is determined based on the received vehicle mode notification information. The information includes the in-convoy order 2 (1) or the like.

At time t4, the convoy travel ECU 30 of the follower vehicle C3 outputs the connection instruction to the communication ECU 130. The connection instruction is addressed to the preceding vehicle (corresponding to the subject vehicle C1 in this case) for the follower vehicle C3. At time t5, the communication ECU 130 of the follower vehicle C3 broadcasts the vehicle mode notification information N31 to the subject vehicle C1, which corresponds to the preceding vehicle for the follower vehicle C3. The vehicle mode notification information N31 includes the connection request signal and the in-convoy order 2 (1). The communication ECU 130 of the subject vehicle C1 obtains the vehicle mode notification information N31 through the communication portion 110.

At time t6, the communication ECU 130 of the subject vehicle C1 notifies the convoy travel ECU 30 of information, which is determined based on the vehicle mode notification information N31. This notification indicates that the follower vehicle C3 has transmitted the connection request signal to the subject vehicle C1.

In the example in FIG. 10, the convoy travel ECU 30 detects the malfunction affecting the connected travel at time t7 (or between time t1 which corresponds to a time when a previous connection instruction is outputted and time t7). The convoy travel ECU 30 of the subject vehicle C1 outputs the separation instruction to the communication ECU 130 (at time t7). In addition to the separation instruction, the convoy travel ECU 30 notifies the communication ECU 130 that the malfunction affecting the connected travel has been detected.

The communication ECU 130, under the separation instruction, broadcasts the vehicle mode notification information N13 including the connection rejection signal (at time t8). The vehicle mode notification information N13 includes information indicating that the malfunction affecting the connected travel has been detected. In addition, the in-convoy order included in the vehicle mode notification information indicates 1 (1). The follower vehicle C3 receives the vehicle mode notification information N13. Since the connection rejection signal is included in the vehicle mode notification information N13, the communication ECU 130 of the follower vehicle C3 changes the forward vehicle detection mode to the separation mode 231.

The communication ECU 130 of the follower vehicle C3 notifies the convoy travel ECU 30 of information, which is determined based on the vehicle mode notification information N13 obtained at time t8 (at time t9). This notification includes information indicating the connection rejection signal and that the malfunction affecting the connected travel has been detected. The convoy travel ECU 30 of the follower vehicle C3 notifies the driver that the preceding vehicle (corresponding to the subject vehicle C1 in this case) has notified the connection rejection, and a reason of the connection rejection.

At time t10, the convoy travel ECU 30 of the follower vehicle C3 outputs the separation instruction to the communication ECU 130. The communication ECU 130 of the follower vehicle C3, based on a receiving of the separation instruction, broadcasts the vehicle mode notification information N31 including the connection non-request signal (at time t11). The subject vehicle C1 receives the vehicle mode notification information N31.

At time t12, the communication ECU 130 of the subject vehicle C1 notifies the convoy travel ECU 30 of information which is determined based on the vehicle mode notification information N31 received at time t11. The convoy travel ECU 30, after receiving the notification, outputs the separation instruction to the communication ECU 130 (at time t13).

The communication ECU 130 of the subject vehicle C1, under the separation instruction, broadcasts the vehicle mode notification information N13 including the connection rejection signal (at time t14). The follower vehicle C3 receives the vehicle mode notification information N13.

The communication ECU 130 of the follower vehicle C3 notifies the convoy travel ECU 30 of information, which is determined based on the vehicle mode notification information N13 received at time t14 (at time t15).

In the example of FIG. 10, when the malfunction affecting the connected travel in the subject vehicle C1 is detected, it is possible that the subject vehicle C1, which corresponds to the preceding vehicle for the follower vehicle C3, notifies the follower vehicle C3 of the connection rejection signal. According to this configuration, it is possible that the follower vehicle C3 swiftly stops the connected travel in response to the malfunction that has occurred in front of the follower vehicle C3, and that the inter-vehicle distance to the subject vehicle C1, which is the preceding vehicle, makes longer.

As described above, although the embodiment of the present disclosure was explained, it should be noted that the present disclosure is not limited to the above embodiment, and that another embodiment described below is also included in a technical scope of the present disclosure. In addition to the embodiment described herein, it should be noted that various modification is possible within a range of the technical scope of the present disclosure.

Another Embodiment 1

For example, at time t8 in FIG. 10, the communication ECU 130 of the subject vehicle C1 may cause the vehicle mode notification information N13 to include a transmission instruction signal in addition to the connection rejection signal and information which indicates a detection of the malfunction affecting the connected travel. The transmission instruction signal instructs the follower vehicle C3 to transmit the connection rejection signal to a vehicle behind the follower vehicle C3. According to this configuration, when a vehicle (e.g., a vehicle C4) traveling behind the follower vehicle C3 exists in the same convoy, it is possible that the vehicle C4 swiftly knows a malfunction occurred in front of the vehicle C4 and that the inter-vehicle distance swiftly expands in response to the malfunction.

Another Embodiment 2

In the above embodiment, the radar 20 calculates the distance to a preceding vehicle (corresponding to an inter-vehicle distance), and the communication ECU 130 calculates the change rate dr (radar) of the inter-vehicle distance. However, the radar 20 may calculate the inter-vehicle distance and the change rate dr (radar) of the inter-vehicle distance. The communication ECU 130 may obtain the change rate dr (radar) of the inter-vehicle distance, which is calculated by the radar 20.

According to a first aspect of the present disclosure, the vehicle-to-vehicle communication device that is mounted to a subject vehicle with a traveling control device that controls speed of the subject vehicle is provided. The vehicle-to-vehicle communication device includes a communication portion, a connection transmission process portion, a connection control signal obtain portion, a connection signal obtain portion, and a connection control signal transmission process portion. The communication portion receives and transmits a signal between the subject vehicle and a preceding vehicle, and between the subject vehicle and a follower vehicle. The preceding vehicle travels immediately in front of the subject vehicle. The follower vehicle travels immediately behind the subject vehicle. The signal includes a connection request signal and a connection control signal. The connection transmission process portion transmits the connection request signal from the communication portion to the preceding vehicle. The connection request signal requests to perform a connected travel. The connection control signal obtain portion obtains the connection control signal from the communication portion, and notifies the traveling control device of the connection control signal. The connection control signal is transmitted from the preceding vehicle, received by the communication portion, and indicates whether the preceding vehicle permits or not a vehicle immediately behind the preceding vehicle to perform the connected travel. The connection signal obtain portion obtains the connection request signal and notifies the traveling control device of the connection request signal. The connection request signal is transmitted from the follower vehicle and received by the communication portion. The connection control signal transmission process portion transmits the connection control signal from the communication portion to the follower vehicle.

According to the present disclosure, the vehicle-to-vehicle communication device of the subject vehicle transmits the connection request signal to the preceding vehicle, which travels immediately in front of the subject vehicle, and receives the connection control signal from the preceding vehicle. In addition, the vehicle-to-vehicle communication device of the subject vehicle transmits the connection request signal to the follower vehicle, which travels immediately behind the subject vehicle, and receives the connection control signal from the follower vehicle. Thus, in the present disclosure, the connection request signal and the connection control signal are transmitted and received between two vehicles which are located immediately in front of and behind each other. According to this configuration, when the preceding vehicle becomes a situation where the follower vehicle should not perform the connected travel with the preceding vehicle, a notification indicating that the connected travel is not permitted is transmitted from the preceding vehicle to the follower vehicle so that it is possible that the follower vehicle is caused not to perform the connected travel.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle-to-vehicle communication device that is mounted to a subject vehicle with a traveling control device for controlling speed of the subject vehicle, the vehicle-to-vehicle communication device comprising:

a communication portion for receiving and transmitting a signal between the subject vehicle and a preceding vehicle, and between the subject vehicle and a follower vehicle, wherein the preceding vehicle travels immediately in front of the subject vehicle, wherein the follower vehicle travels immediately behind the subject vehicle, wherein the signal includes a connection request signal and a connection control signal;

a connection transmission process portion for transmitting the connection request signal from the communication portion to the preceding vehicle, wherein the connection request signal requests to perform a connected travel;

a connection control signal obtain portion for obtaining the connection control signal from the communication portion, and notifying the traveling control device of the connection control signal, wherein the connection control signal is transmitted from the preceding vehicle, is received by the communication portion, and indicates whether the preceding vehicle permits or not a vehicle immediately behind the preceding vehicle to perform the connected travel;

a connection signal obtain portion for obtaining the connection request signal and notifying the traveling control device of the connection request signal, wherein the connection request signal is transmitted from the follower vehicle and received by the communication portion; and a connection control signal transmission process portion for transmitting the connection control signal from the communication portion to the follower vehicle;

a malfunction detection portion for detecting a malfunction affecting the connected travel, wherein:

the connection control signal transmission process portion, when the malfunction detection portion detects the malfunction affecting the convoy travel, transmits a connection rejection signal as the connection control signal from the communication portion for the follower vehicle; and the connection rejection signal indicates that the subject vehicle does not permit the connected travel.

2. The vehicle-to-vehicle communication device according to claim 1, wherein:

when the malfunction detection portion detects the malfunction affecting the connected travel, the connection control signal transmission process portion transmits the connection rejection signal and a transmission instruction signal from the communication portion for the follower vehicle; and the transmission instruction signal instructs the follower vehicle to transmit the connection rejection signal to another vehicle behind the follower vehicle.

3. The vehicle-to-vehicle communication device according to claim 1, wherein:

a connection rejection operating device is connected to the vehicle-to-vehicle communication device;

the connection rejection operating device is operated by a driver;

the connection rejection operating device generates, based on a driver's operation, a separation instruction signal for instructing the subject vehicle to reject the connected travel;

the connection control signal transmission process portion, based on a generation of the separation instruction signal, transmits the connection rejection signal as the connection control signal from the communication portion for the follower vehicle; and the connection rejection signal indicates that the connected travel is not permitted.

4. A convoy travel control device comprising:

the vehicle-to-vehicle communication device according to claim 1; and the traveling control device according to claim 1, wherein:

the traveling control device periodically outputs a first instruction and a second instruction to the vehicle-to-vehicle communication device, the first instruction indicating whether the subject vehicle should connect to or separate from the preceding vehicle, and the second instruction indicating whether the subject vehicle should connect to or separate from the follower vehicle;

the connection transmission process portion, based on the first instruction outputted from the traveling control device to connect with the preceding vehicle, transmits the connection request signal from the communication portion; and the connection control signal transmission process portion, based on the second instruction which is outputted from the traveling control device, determines whether the connection control signal should indicate a permission of the connected travel or a prohibition of the connected travel.

* * * * *